Aug. 12, 1969 F. E. BADIN 3,460,658

CENTRIFUGAL FLUID-POWDER CLUTCH WITH RADIAL GROOVES

Filed Jan. 8, 1968 3 Sheets-Sheet 1

FERDINAND E. BADIN
INVENTOR

BY [signature]

ATTORNEYS

Aug. 12, 1969 F. E. BADIN 3,460,658

CENTRIFUGAL FLUID-POWDER CLUTCH WITH RADIAL GROOVES

Filed Jan. 8, 1968 3 Sheets-Sheet 2

FERDINAND E. BADIN

INVENTOR

CENTRIFUGAL FLUID-POWDER CLUTCH WITH RADIAL GROOVES

Filed Jan. 8, 1968 3 Sheets-Sheet 3

FERDINAND E BADIN
INVENTOR

United States Patent Office 3,460,658

Patented Aug. 12, 1969

3,460,658

CENTRIFUGAL FLUID-POWDER CLUTCH WITH RADIAL GROOVES

Ferdinand Edmond Badin, Paris, France, assignor to Centri-Engineering, Paris, France, a French body corporate Filed Jan. 8, 1968, Ser. No. 696,336
Claims priority, application France, Jan. 19, 1967, 91,775
Int. Cl. F16d *23/10, 43/24, 31/00*
U.S. Cl. 192—105 11 Claims

ABSTRACT OF THE DISCLOSURE

A centrifugal clutch for mechanical transmission which includes a casing and an internal rotor with a granular or pseudo-fluid material between these two elements, wherein a face of the rotor opposite a face of the casing has grooves which are substantially radial and rounded at the base, and the said face of the casing has anlogous grooves but whose width, measured in the peripheral direction is different from that of the grooves of the said rotor face.

The invention concerns centrifugal clutches in which use is made of a granular or psuedo-fluid-material i.e., spherical or granulated material, or small balls, as connecting elements transmitting a torque between the driving element and the driven element. A clutch of this type has a casing enclosing a rotor and the pseudo-fluid serves to effect connection between the casing and the rotor.

It is known that clutches of this type can achieve the progressive transfer of torque between the driving element and the driven element, but as they are under the influence of centrifugal force they cannot be disengaged at will, and this means that they cannot be used for certain applications unless accessory devices are provided, this being the case in particular for automobiles, where disconnection is necessary for gear changing. On the other hand, for traction and numerous industrial applications, a torque much greater than the normal torque is required on starting up.

Centrifugal clutches of this type are already known which in certain arrangements have an output efficiency which closely approximates to unity, but they have on the other hand the disadvantage that they do not allow prolonged slipping to take place, by reason of the localized temperature increases that occur. In fact, in the operation of these clutches, small heaps of granular material are found immobilised or wedged between convergent surfaces of the casing and of the rotor, with the result that the heat released by the friction of these heaps against the rotor, when a slipping movement takes place, cannot be dissipated.

The aim of the invention is to produce an improved clutch of the above-mentioned type, which at the cost of only a slight drop in the output efficiency, can accommodate a prolonged slip of some magnitude, without a prohibitive rise in the operating temperature occurring.

The centrifugal clutch of the invention has the feature that a face of the rotor opposite a face of the casing has grooves which are substantially radial and rounded at the base, and the said face of the casing has analogous grooves, but whose width, measured in the peripheral direction, is different from that of the grooves of the said rotor face.

The surface of the rotor and that of the casing preferably have a continuous series of grooves of similar dimensions, successive grooves being separated by a substantially rectilinear and radial edge defined by the intersection of two rounded surfaces of the bases of adjacent grooves.

In operation, the grooves, facing and defiling in relation to each other, determine the volume within which a certain circulation of the granular material is to take place, the passage of the said material from the interior towards the walls of the box transferring to the said walls the heat generated by the friction, so that the said heat can be dissipated to the outside.

Accordingly prolonged slipping does not bring about a local temperature increase.

In an arrangement of this type, in the absence of known clutches, the turbulence of the granular material is made use of and systematised for getting rid of the heat, without substantial impairment of the output efficiency, which can still be greater than 99%.

The tendency to slip can be restricted by increasing the number of grooves on the casing and rotor faces respectively, i.e. the number of narrowed intervals between them; by increasing the depths of the said grooves to constitute reserves of granular materials; by accentuating the projection of the separating edges between grooves and by arranging the grooves of the rotor and those of the casing at an angle in relation to each other to form between them convergent spaces assisting and channeling the piling up of the granular material towards the periphery.

Conversely, i.e. by the use of shallow grooves, few in number and separated by rounded edges that are slightly convergent or parallel, slip is assisted. A single clutch with suitably selected features can be connected in the transmission to ensure progressive coupling and limitation of the torque.

Because of its capacity to slip without danger of destruction, the clutch of the present invention can constitute a powerful and progressive brake. For this purpose, the rotor or the casing is made integral with a shaft of the machine, i.e. engine or vehicle to be braked, whilst the casing or rotor, which normally rotates freely with the shaft, can be immobilised at the instant of need by connection with the framework of the engine. The kinematic energy of the latter is then destroyed in the clutch and the heat released is dissipated through the casing.

Finally, as will be seen below, it can be of advantage to combine in one and the same transmission at least two automatic clutches having differing characteristics, in order to obtain automatically the conversion of the torque transmitted.

It is also known that with clutches of this type the said slip is a function of the filling rate of the casing with granular material.

In a preferred embodiment of the invention, the variation in the operation of the said rate of filling is achieved by varying the volume of the casing by effecting a variation in the spacing of its two constituent side plates.

It is also possible to vary the torque causing the slip, the duration of the said slip or the moment of its appearance.

Variation in the spacing of the side plates of the casing can be obtained by controlled means or automatically, for example under the effect of centrifugal force by means of suitable weights. In fact, since with clutches of this type the slip tends to decrease when the rate of rotation increases as a result of the compacting of the granular material under the action of centrifugal force, it is possible, by apparent reduction in the filling rate, to compensate for the said decrease in slip possibilities; conversely it is also possible to reduce the volume in order to decrease the slip.

By virtue of the extended slip which they allow, several centrifugal clutches in accordance with the invention can be grouped in such a way that they act in sequence and accordingly put successive and automatic kinematic chain-reactions into operation, and in particular geared transmissions ensuring the conversion of torques of variable ratio.

It is accordingly possible, in particular for automobiles, to produce automatic gear change devices, or to put large masses of inertia progressively into movement. For this purpose, the transmission of the invention, between the drive shaft and the driven shaft has at least two power transmission paths comprising a first clutch with relatively little slip driving on the one hand the driven shaft by means of a free wheel train with relatively high reduction, and, on the other hand, at least one second clutch with greater slip than the first clutch, which is connected to the driven shaft by a train whose reduction is less in relation to that of the first train.

Of course more than two transmission paths could be provided, each associated with a clutch, the said clutches being mounted in cascade and having increasing slipping capacity, driving the output shaft by reductions that can become progressively less.

Accordingly, on starting up, the most reduced train takes charge and successively the trains where the reduction is progressively less, until the drive torque can be transmitted at the highest rate of rotation. Conversely, when the resistant torque increases, the clutches corresponding to the trains having little reduction become unsynchronized and are the first to slip, allowing the trains with high reduction to take over for the transmission of a suitable drive torque to the resistant couple.

It should be noted that the clutches and transmissions of the invention have moreover the advantage that they function as torque limiters, torque vibration filters or if need be, brake devices.

The invention will now be described with reference to the accompanying drawings, which show embodiments of the invention but in no restrictive sense.

Figure 1:
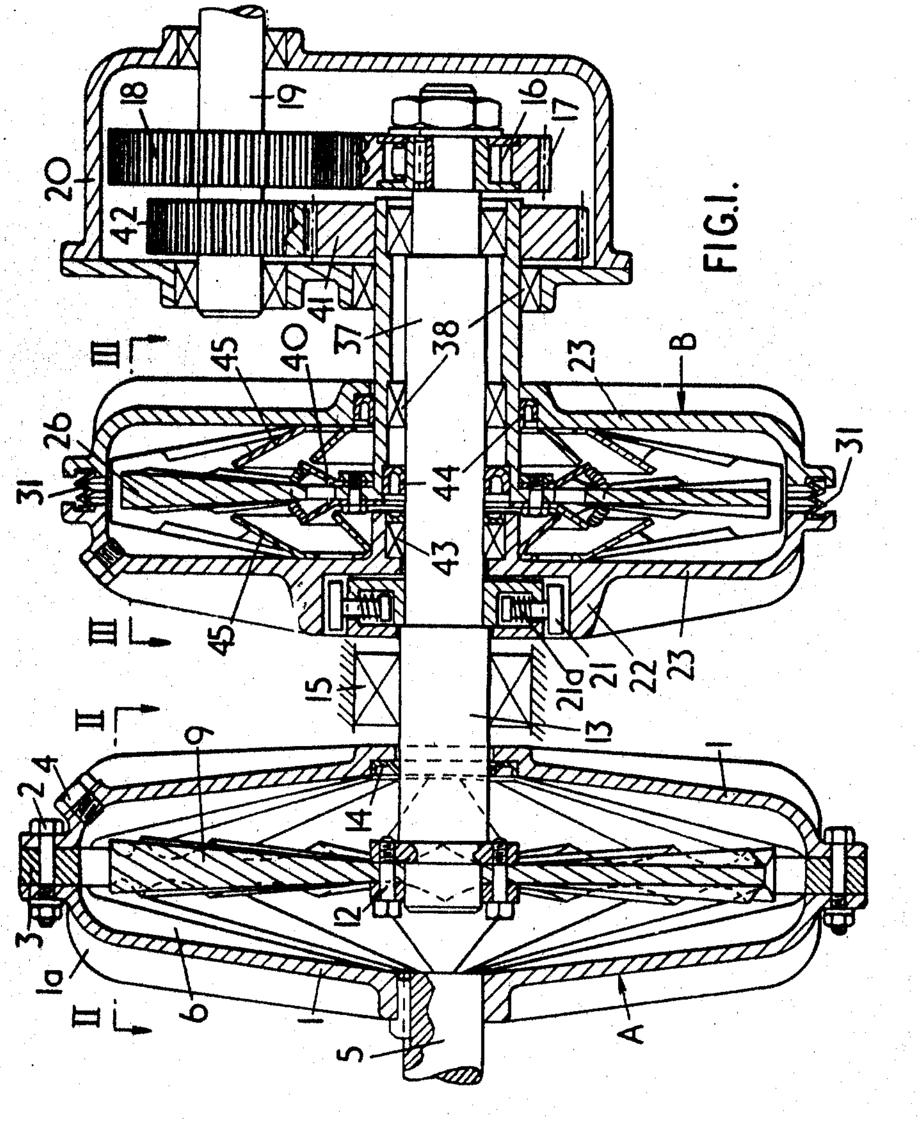
FIGURE 1 shows a longitudinal section of a first embodiment of transmission in accordance with the invention.
Figure 2:
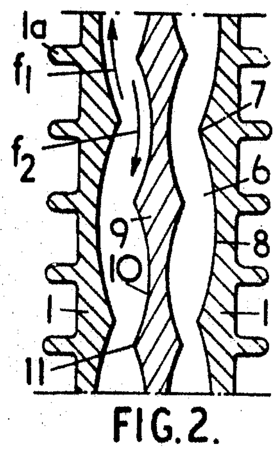
FIGURE 2 is a section along the line II—II of FIGURE 1.

The embodiment shown in FIGURE 1 comprises two clutches, referenced A and B. The clutch A has a casing constituted of two side plates 1, assembled by means of bolts 2 by means of cross pieces 3. The said side plates 1 can be moulded or produced by stamping. They have cooling fins 1*a* and one of them is provided with a filling stopper 4 for the insertion of the pseudo-fluid or granular material G.

The choice of thickness of the spacing pieces 3 determines the internal volume of the casing and consequently for the same amount of the said pseudo-fluid G, the adjustable rate of filling of the said casing. The thickness of the spacing pieces also determines the spacing between the side pieces, i.e. the distance of the grooves which are provided on the internal faces of the said side pieces. As will be seen below, this distance also determines the slip of the clutch.

The granular material G is preferably either a granulated metal, advantageously of stainless steel, or small balls of cut steel or small spherical material having a diameter less than 2 mm. These materials have the advantage that they provide great stability of operation and have considerable resistance to abrasion and to agglomeration by fritting under heat. These qualities can be improved by mechanical or chemical treatment such as sulfinisation or by adding a small amount of lubricating products and products for mutually isolating the grains, such as silicon fats, graphite or molybdenum disulfide.

The casing produced in this way is rigidly connected to the drive shaft 5, and has internal substantially radial grooves 6, two consecutive grooves being separated by an edge 7. The general construction of the faces of the casing 1 is conical, or may be flat, and the edges 7 have an angle of inclination in relation to the axis of the casing which can be between 50° and 70°. On the periphery of the casing the number of grooves 6 is at least equal to 12 in the case of the box 1. These grooves are relatively deep, moreover, i.e. the curve 8 which defines the section thereof and which is substantially the arc of a circle, has a height, which, in one example, is approximately ⅙ of its length.

In the medial plane of the box is arranged the rotor 9, the faces of which lying opposite those of the casing also have grooves 10, the number of these grooves, though also great, being different from that of the grooves 6; to take a specific case, about 10. As above, these grooves are relatively deep and are separated from each other by sharp edges 11.

To avoid the edges of the rotor coming periodically face to face with the edges of the casing, the numbers of the grooves of the rotor and of the casing may have no common factors. Moreover, the grooves of the two faces of the rotor and of the two parts of the casing can be angularly dispaced so that the passages of the narrowed intervals between the edges of the casing and those of the rotor are not found simultaneously on both sides of the clutch.

The surfaces of the casing and the rotor can be increased and improved as far as concerns their contact with the granular material by metalisation carried out by projection, for instance by the Schoop method or some other method.

Figures 4, 5:
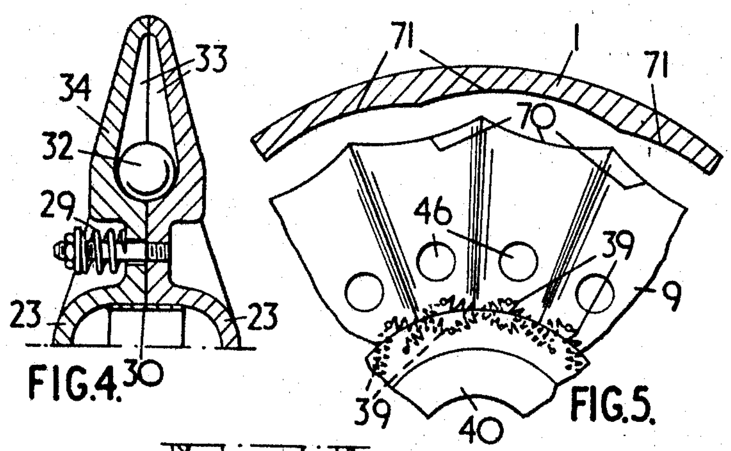
FIGURE 4 is a detail on an enlarged scale of FIGURE 1.
FIGURE 5 is a detail in elevation of a rotor in the interior of a box.

Furthermore, at the periphery (FIGURE 5), to avoid the wedging of heaps of powder, the edge of the rotor and/or the base of the casing can also have a succession of grooves and reliefs 70 and 71 respectively.

Finally, the thickness of the rotor 9 is much greater at the periphery than at the centre with the result that the grooves 10 and the edges 11 are oblique in relation to the axis of the rotor, the angle of inclination to the axis being nevertheless smaller than for the edges 7.

The rotor 9 is joined to the shaft 13 by means of the collar 12. A joining device 14 which can be constituted as shown by a stamped metal strip or a rubber ring or a silicon product, prevents the outlet of the granular material enclosed in the casing.

A pinion 17 meshing with the pinion 18 on the driven shaft 19 is mounted on the shaft 13 by means of a free wheel 16 (for instance a known free wheel with jamming rollers 16*a*), said shaft 13 being carried by fixed bearings such as 15. The unit is mounted in the gear box 20.

Figure 3:
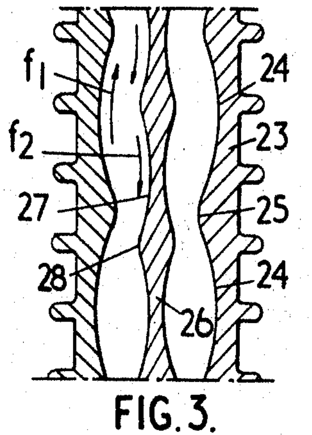
FIGURE 3 is a section along the line III—III of FIGURE 1.

The shaft 13 also has centrifugal coupling weights 21 adapted to engage with a cylinder 22 which is integral with one of the side pieces 23 of the casing of the second clutch B. The said clutch B is in the main similar to the clutch A, but the radial grooves 24 of the casing of this clutch (see FIGURE 3) are not so deep as the grooves 6 of the casing of the clutch A and the edges 25 which separate two grooves 24 are rounded. The said edges are moreover positioned slightly at an angle in relation to the axis of the clutch.

The rotor 26 of the clutch B, which is also thicker at the periphery than at the centre, also has the less deep radial grooves 27, separated by edges that are likewise rounded. In this embodiment, however, the number of grooves 27 of the rotor is greater than that of the grooves 24 of the casing.

In the embodiment illustrated, the two side pieces 23 which constitute the casing of the clutch B are assembled by means of springs 29, whereas the interruption in series which can appear at the junction of the two side pieces is closed by a peripheral strip of sheet 30 fixed to one of these two side pieces. The said strip of sheet is intended to prevent the granular material from escaping out of the box through the space between the side pieces. The strip of sheet can be supplemented or replaced by a bellows 31, for sealing the box.

The spacing apart of the two side pieces constituting the casing is determined by weights 32 in the form of spheres which can move along inclined ramps 33 formed upon the internal faces of lugs 34 of the side pieces. By virtue of this arrangement, the side pieces tend to be more spaced apart the greater the rate of rotation of the casing, which action increases the distance between the rotor and the faces of the casing and decreases the apparent filling rate of the casing with granular material. By twisting the lugs 34 slightly, the reverse effect can be obtained, i.e. the side pieces are brought together with an increase in the rotation rate and consequently a concomitant increase in the filling rate.

Figure 6:
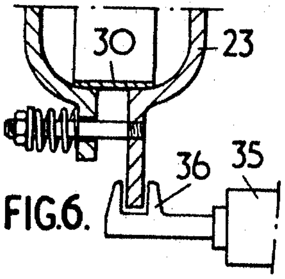
FIGURE 6 shows diagrammatically the mechanical realization of the variable volume casing.

As FIGURE 6 shows, the spacing of the side pieces 23 can also be varied at will by means of jacks 35 acting on small forks 36 imprisoning the edge of one of the side pieces.

The rotor 26 is connected to a shaft 37 which is coaxial with the shaft 13 and can rotate in relation to the latter in bearings 38. To enable the rotor 26 to follow the variations in dimension of the associated casing, the rotor is connected to the shaft 37 by means of springs 39 (FIGURE 5) which are arranged like the spokes of a bicycle wheel and connected to the shaft 37 by two conical flanges 40.

The shaft 37 carries a fixed pinion 41 which meshes with the pinion 42, likewise fixed to the driven shaft 19.

The casing of the clutch B is rotatably carried in relation to the shaft 13 by bearings 43 and, as above, sealing fittings 44 of metal strip or rubber confine the granular material to the casing.

The return of the granular material towards the central part of the clutch B can furthermore be restricted by sheet baffles 45. Finally holes 46 (FIGURE 5) passing through the rotor can if need be facilitate the distribution of the granular material on both sides of the rotor.

The device which has been described above functions in the following way: when the drive shaft 5 is rotated, it drives directly the casing of the clutch A and by reason of this fact tends to distribute the granular mass G to the periphery of the said casing. By the effect of friction acting in the main in the narrowed spaces between edges of the rotor and edges of the casing, the rotor is rotated. As the numbers of grooves of the casing and of the rotor are different, their edges do not coincide simultaneously, which ensures a smooth progressive drive. A certain amount of granular material is, however, located in the grooves of the rotor and of the casing, and because of the different speed of rotor and casing, the granular material housed in the grooves of the casing is driven in the direction of the arrow $f_1$, whereas that in the grooves of the rotor carries out a relative movement in the direction of the arrow $f_2$.

Because of the rounded construction of the grooves facing each other, circulation of the granular material tends to be set up, i.e. the exchange of what is contained in the grooves of the rotor for what is contained in the grooves of the casing. The heat released by the friction is accordingly brought towards the wall of the casing and is removed to the outside through the fins of the latter. The heat distribution released can be estimated at 85% in the granular material and only 10% in the rotor: the cooling of the unit is facilitated by the mixing of the granular material and its being brought in contact with the casing.

When the shaft 13 attains a certain speed which can be determined by the power of the counter-acting springs **21*a* of the weights 21, automatic coupling takes place between the shaft 13** and the casing of the rotor B. The casing of the rotor B begins to rotate and by the same mechanism as that explained for the rotor A, this rotor is progressively rotated.

When the shaft 13 was rotated on its own, the driven shaft 19 was moved by the pinions 17, 18 at low speed but with a torque increased in proportion to the reduction. When in turn the shaft 37 is driven, the shaft 19 is moved by the pinions 41 and 42 at higher speed. By virtue of the free connecting wheel between pinion 17 and the shaft 13, this pinion can rotate more quickly than the said shaft with the result that the transmission power passing through the shaft 13 becomes inoperative.

As will be understood, in the clutch B, because of the slight angle of inclination of the grooves in relation to the axis, their slight depth and the rounded construction of the edges which separate them, this clutch B has a tendency to slip which is much more accentuated than that of the clutch A. When the resisting torque on the shaft 19 tends to increase, the clutch B slips and once more power is transmitted by means of shaft 13 to the driven shaft.

When the speed increases through the effect of the weights 32, the distance of the side pieces of the casing B is increased, which fact, by enlarging the narrowed spaces between casing and rotor and by decreasing the apparent rate of filling of the casing, compensates for the increase in compactness of the granular material at the periphery of the clutch B, which increase tends to diminish the slip. If the volume of the clutch B is adjusted in the way shown in FIGURE 6, regulation can be carried out by adapting the slip of the clutch B to resistant torque in accordance with circumstances and not only in co-relation with the speed.

A particular advantage of the clutch device of the invention is that there is always a slight slip between the box and the rotor which can be reduced to less than 1%. Accordingly there is never blockage of the clutch and consequently jerks are avoided during the changes in running speed or in torque.

Finally it is obvious that when the rotation rate of the drive shaft 5 drops to below a certain limit the residual torque driving the shaft 13 is insufficient to drive the driven shaft 19, particularly if the latter is immobilished by a brake, as can be the case with a vehicle.

Figures 7, 8:
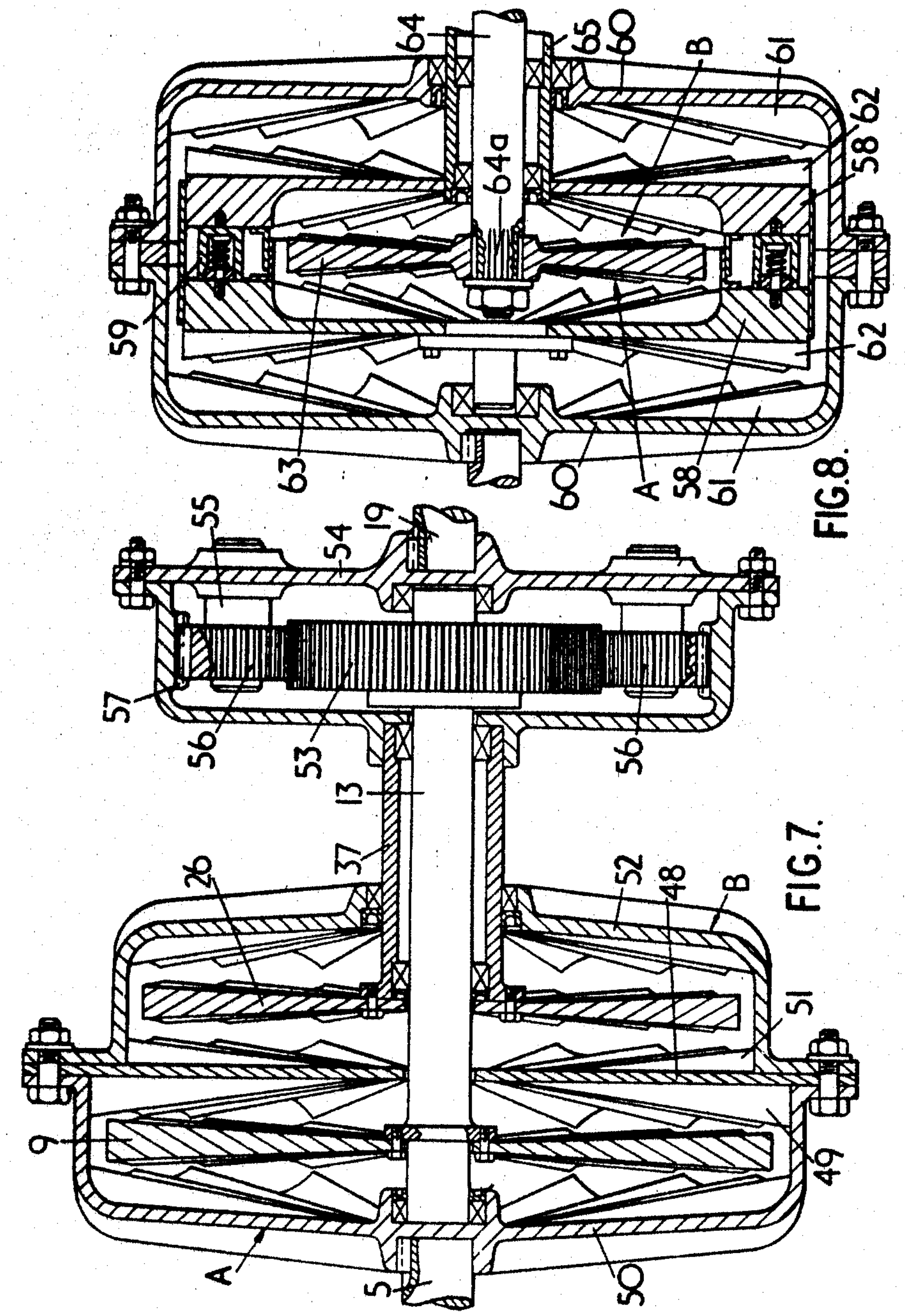
FIGURE 7 shows in longitudinal section a further embodiment of the transmission of the invention.
FIGURE 8 shows another embodiment of the transmission of the invention comprising two centrifugal clutches, one of which is inside the other.

In the embodiment illustrated in FIGURE 7, the two clutches A and B are housed in the same casing which is divided by a partition 48, whose face turned to the clutch A has grooves 49 similar to those of the side piece 50 which constitutes the other half of the casing of the clutch A; the other face having the grooves 51 which in analogous manner are similar to those of the side piece 52.

In this embodiment, the two rotors 9 and 26 are simultaneously acted upon during the rotation of the casing, but the slip of the clutch B being greater than that of the clutch A, the drive of the second clutch takes place only when a certain rotation rate has been reached.

In this embodiment moreover, the gear box is a simple satellite reducer, whose shaft 13 drives the central pinion 53 by means of a free wheel, whereas the shaft 37 drives the gear box 54 fixed to the carrier axles 55 of the satellites 56.

At low speed, the gearbox 54 is driven by means of the said satellites by virtue of the internal crown 57 of the gearbox, whereas at high speed, the driven shaft 19, likewise fixed to the gearbox 54, is driven directly by the shaft 27.

In the embodiment illustrated in FIGURES 8, the clutch B is inside the clutch A. The rotor of the latter is formed in two parts 58 assembled by compression spring devices 59 which tend to bring these two parts together. The side pieces 60 comprise grooves 61 which co-operate with the grooves 62 of each of the two halves of the rotor A for the mixing of the granular connecting material, in the clutch A, between a casing and the rotor, whereas the rotor 63 of the clutch B is mounted on channels 64*a* of the driven shaft 64 in such a way as to centre itself automatically during variations in the volume of this cavity, within the cavity of the rotor A which constitutes the casing of the rotor B.

In this embodiment, the external shaft 65 is, as above, coupled by means of a free wheel to a gear train with high reduction, i.e. low speed, whereas the internal shaft 64 is coupled to the low reduction, i.e. through high speed. In other words the arrangement of the concentric shaft is the reverse of that shown in FIGURES 1 and 7.

The functioning is similar to that which has already been described in connection with FIGURE 1.

In the majority of industrial machines and vehicles where it is proposed to transmit as rapidly as possible the drive torque to the engine being driven, the casings are fixed to the drive shaft, and the rotors, as illustrated in the figures, are connected to the output of the transmission. If a certain spreading out of the time of the driving torque or the lamping of the torque vibrations is desired, the mounting can be reversed, i.e. the rotors can be fixed to the engine and the boxes connected to the driven shaft.

Of course modifications can be made in the embodiments which have just been described, in particular by the substitution of equivalent technical means, without thereby going beyond the scope of the present invention.

I claim:

1. A centrifugal clutch for mechanical transmission which includes a casing and an internal rotor with a granular or pseudo-fluid material between these two elements, wherein a face of the rotor opposite a face of the casing has grooves which are substantially radial and rounded at the base, and the said face of the casing has analogous grooves but whose width, measured in the peripheral direction, is different from that of the grooves of the said rotor face.

2. A clutch according to claim 1, wherein the face of the rotor has a different number of grooves from the face of the casing.

3. A clutch as claimed in claim 1, wherein the grooves of the rotor and those of the casing have convergent directions towards the periphery of the clutch.

4. A clutch as claimed in claim 1, wherein the surface of the rotor and that of the casing have a continuous series of grooves similar in dimension and of generally conical construction, two successive grooves being separated by substantially rectilinear and radial edge defined by the intersection of the two rounded surfaces of the bases of the grooves.

5. A clutch as claimed in claim 1, wherein the thickness of the rotor increases from the centre towards the periphery.

6. A clutch as claimed in claim 1, wherein means are provided for varying the volume of the casing, and thus varying the torque.

7. A clutch as claimed in claim 6, wherein the variation in volume is obtained by the displacement of weights subjected to the action of centrifugal force.

8. A clutch as claimed in claim 1, wherein the rotor is connected to its support shaft by means permitting its axial displacement.

9. A clutch as claimed in claim 8, wherein the said means are springs.

10. A clutch as claimed in claim 1 provided in a transmission interposed between a motor and a driven shaft, said clutch constituting a first clutch with relatively low slip driving on the one hand the driven shaft by means of a first kinematic chain with free wheel of relatively high reduction and on the other hand, at least one second clutch, with a slip greater than the first clutch, which is connected to the driven shaft by a second kinematic chain whose reduction is less than that of the first chain, and thus put successive and automatic chain reaction into operation.

11. A braking device which includes a clutch as claimed in claim 1, wherein one of the two elements of the clutch is fixed to a shaft, whereas the other element, which normally rotates with the first-mentioned element, can be connected when required to a fixed framework or member to cause braking of the shaft relative to the fixed framework or member.

References Cited

UNITED STATES PATENTS

| | | |
|---|---|---|
| 2,281,541 | 5/1942 | Ash. |
| 2,813,606 | 11/1957 | Badin. |

BENJAMIN W. WYCHE III, Primary Examiner

U.S. Cl. X.R.

74—731, 750; 188—90; 192—21, 58